(12) United States Patent
Couleur et al.

(10) Patent No.: US 10,903,741 B1
(45) Date of Patent: Jan. 26, 2021

(54) REGULATED POWER CONVERTER WITH ADIABATIC CHARGE PUMP

(71) Applicant: Apple Inc., Cupertino, CA (US)

(72) Inventors: Michael Couleur, Rottach-Eger (DE); Nikola Javanovic, Munich (DE); Siarhei Meliukh, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/816,227

(22) Filed: Mar. 11, 2020

(51) Int. Cl.
*H02M 3/07* (2006.01)
*H02M 3/156* (2006.01)

(52) U.S. Cl.
CPC .............. *H02M 3/07* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 6,987,680 B2 * | 1/2006 | Vire .................. | H02M 3/07 363/124 |
| 8,854,019 B1 * | 10/2014 | Levesque ............... | H02M 3/07 323/266 |
| 9,413,234 B2 | 8/2016 | Tomasz et al. | |
| 9,444,329 B2 * | 9/2016 | Arno ..................... | H02M 3/07 |
| 10,069,408 B2 * | 9/2018 | Abdulslam ............ | H02M 3/07 |
| 10,084,384 B1 * | 9/2018 | Kotikalapoodi .... | H02M 3/1588 |
| 10,090,808 B1 | 10/2018 | Henzler et al. | |
| 2015/0229160 A1 | 8/2015 | Kawakami et al. | |
| 2019/0229623 A1 * | 7/2019 | Tsuda ..................... | H02M 3/00 |

\* cited by examiner

*Primary Examiner* — Jeffery S Zweizig
(74) *Attorney, Agent, or Firm* — Kowert, Hood, Munyon, Rankin & Goetzel, P.C.

(57) ABSTRACT

A power converter circuit included in a computer system may include an adiabatic charge pump which includes multiple capacitors different numbers of which are used to charge and discharge a switch node coupled to regulated power supply node via an inductor. A control circuit may control the dividing ratio of the charge pump circuit as well as determine respective durations of when the charge pump circuit is charging and discharging the switch node.

20 Claims, 12 Drawing Sheets

ABATIC CHARGE PUMP

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a charge pump circuit that includes a plurality of capacitors, and a switch node coupled to a regulated power supply node via an inductor, may be configured to charge the switch node during a first charge period using a first set of the plurality of capacitors. The charge pump circuit may be further configured to discharge the switch node during a first discharge period using the first set of the plurality of capacitors. A control circuit may be configured to determine a duration of the first charge period using a reference voltage level and a voltage level of the regulated power supply node, and determine a duration of the first discharge period using a voltage level of at least one capacitor of the first set of the plurality of capacitors.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuits that include both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple devices and a switch node that is coupled to a regulated power supply node via an inductor. Particular devices are then activated to periodically charge and discharge the switch node in order to maintain a desired voltage level on power supply node.

The inventors realized that the design of such buck converter circuits must trade off inductor size versus efficiency of the buck converter circuit. For example, as a value of an inductor is decreased, the higher the switching frequency must be in order to maintain a desired voltage level on a regulated power supply node. The higher switching frequency, however, results in higher switching losses, decreasing the efficiency of the buck converter circuit.

The embodiments illustrated in the drawings and described below may provide techniques for operating a power converter circuit with a higher efficiency while reducing a value of the inductor by decreasing a voltage ripple across the inductor, and maintaining a flat (or "constant") inductor current during a portion of the regulation cycle, both of which improve the efficiency of the power converter circuit.

Figure 1:
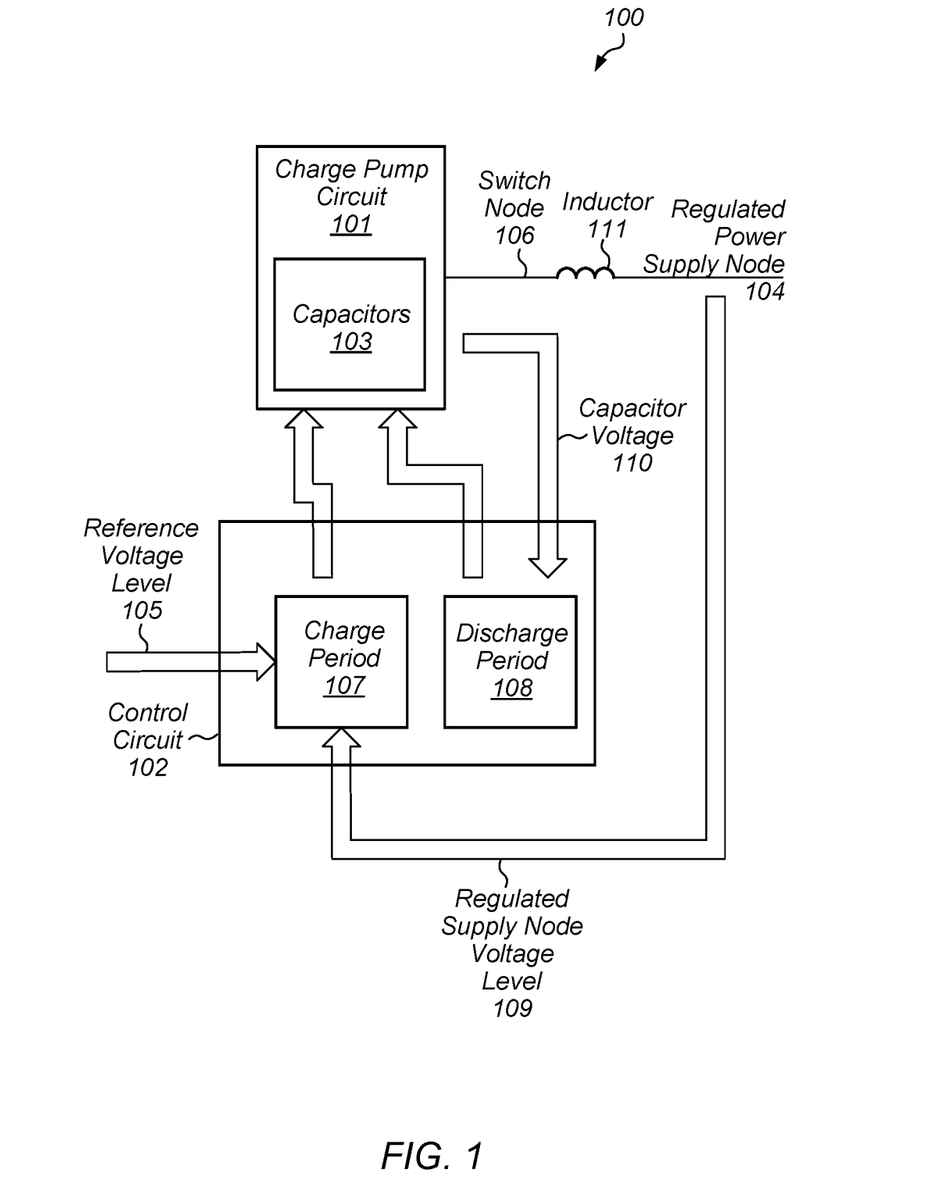
FIG. 1 is a block diagram of an embodiment of a power converter circuit.

A block diagram depicting an embodiment of a power converter circuit is depicted in FIG. 1. As illustrated, power converter circuit 100 includes charge pump circuit 101 and control circuit 102.

Charge pump circuit 101 is a particular embodiment of an adiabatic charge pump circuit configured to selectively charge and discharge switch node 106. By selectively charging and discharging switch node 106, charge pump circuit 101 is able to maintain a desired voltage level on regulated power supply node 104. As illustrated, charge pump circuit 101 includes capacitors 103 and is coupled to switch node 106, which is, in turn, coupled to regulated power supply node 104 via inductor 111. The inclusion of inductor 111 between switch node 106 and regulated power supply node 104, limits the rate of charge transfer between capacitors 103 and regulated power supply node 104, thereby allowing for, at least, partial adiabatic operation.

In various embodiments, charge pump circuit 101 is configured to charge switch node 106 during charge period 107 using a first set of capacitors 103, and discharge switch node 106 during discharge period 108 using the first set of capacitors 103. In other embodiments, charge pump circuit 101 is further configured to charge switch node 106 during a second charge period using a second set of capacitors 103, and discharge the switch node during a second discharge period using the second set of capacitors 103. It is noted that a number of capacitors included in the second set of capacitors may be different from a number of capacitors included in the first set of capacitors.

As described below in more detail, control circuit 102 may include a state machine that transitions between a series of different states, each corresponding to a particular operation mode, e.g., dividing ratio, of charge pump circuit 101. In various embodiments, control circuit 102 may use various operating parameters, e.g., current flowing through inductor 111, to determine when to transition from one state to another state. By adjusting the duration of charge and discharge periods, as well as switching dividing ratios within charge pump circuit 101, control circuit 102 may, in some embodiments, allow for a high efficiency using a smaller value inductor by decreasing a voltage ripple across the inductor, and may maintain a flat (or "constant") inductor current during a portion of the regulation cycle.

Control circuit 102 is configured to determine a duration of charge period 107 using reference voltage level 105 and regulated supply node voltage level 109. Additionally, control circuit 102 is further configured to determine a duration of discharge period 108 using capacitor voltage 110. In various embodiments, capacitor voltage 110 is a voltage level across at least one of the first set of capacitors 103.

Figure 2:
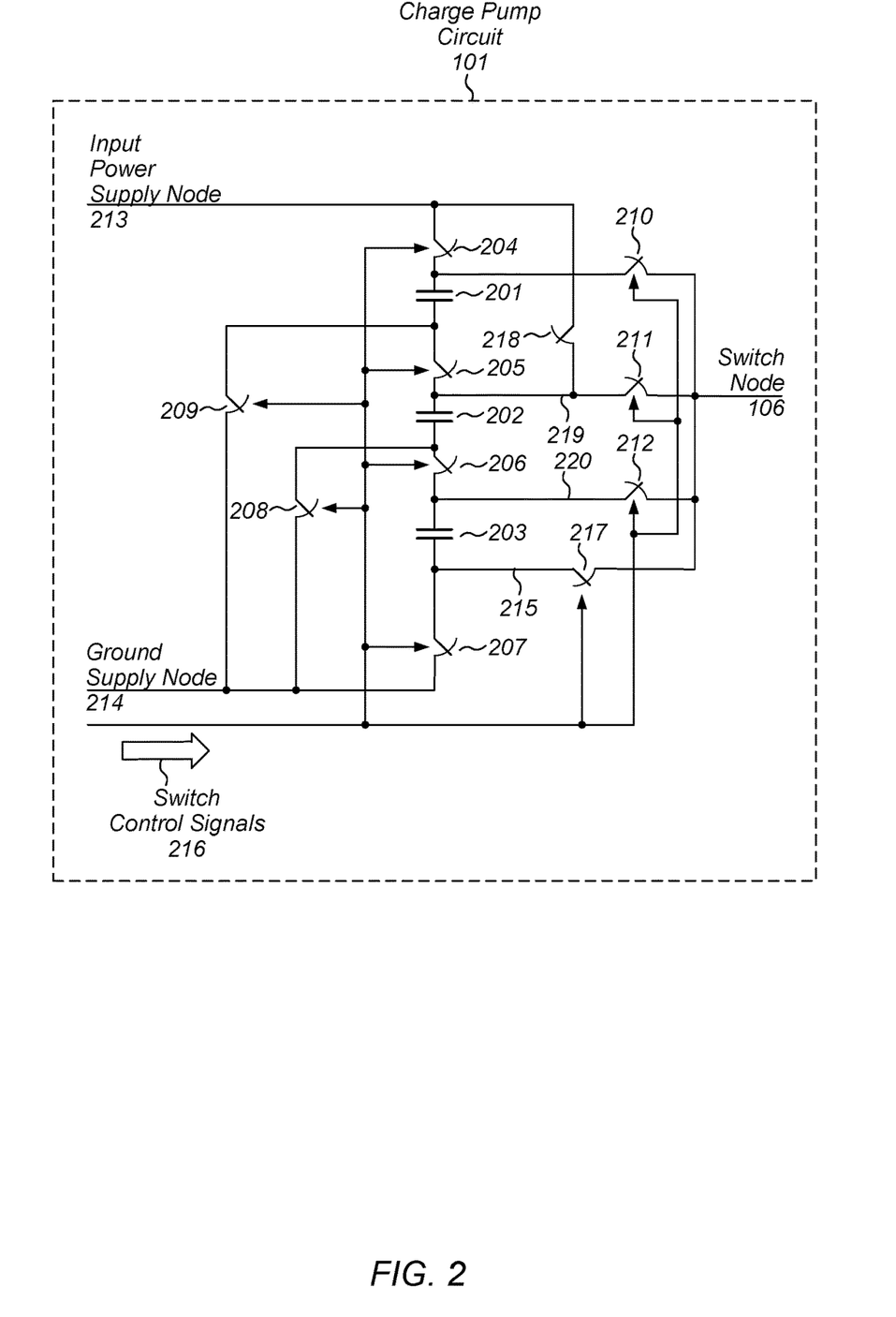
FIG. 2 is a block diagram of an embodiment of a charge pump circuit.

A block diagram of an embodiment of charge pump circuit 101 is depicted in FIG. 2. As illustrated, charge pump circuit 101 includes capacitors 201-203, and switches 204-212, each of which are controlled by switch control signals 216. It is noted that capacitors 201-203 may be particular embodiments of metal-oxide-metal ("MOM") capacitors, or any other suitable capacitor structures that can be fabricated using a semiconductor manufacturing process. It is further noted that switches 204-212 may include one or more metal-oxide semiconductor field-effect transistors (MOSFETs) or any other suitable switching device.

Capacitor 201 is coupled to switches 204, 205, 209, and 210. Switch 204 is further coupled to input power supply node 213, while switch 209 is coupled to ground supply node 214. Switch 210 is further coupled to switch node 106.

Capacitor 202 is coupled to node 219 as is switch 205 and switch 218, which is also coupled to input power supply node 213. Capacitor 202 is also coupled to switch 206, and switch 208, which is coupled to ground supply node 214. Switch 206 is further coupled to node 220. Switch 212 is coupled between node 220 and switch node 106. Switch 211 is coupled between node is coupled between node 219 and switch node 106.

Capacitor 203 is coupled between nodes 215 and 220. Switch 207 is coupled between node 215 and ground supply node 214. Switch 217 is coupled between node 215 and switch node 106.

Charge pump circuit 101 may operate using different dividing ratios. For example, charge pump circuit 101 is configured to operate with either a dividing ratio of 3 or a dividing ratio of 4. As used and defined herein, a dividing ratio refers to ratio of an output voltage level generated by a charge pump circuit and an input voltage level used by the charge pump circuit to generate the output voltage level. The dividing ratio of a charge pump circuit may be adjusted during different phases of operation by altering the settings of the various switches so that different numbers of the available capacitors are used.

When operating in a charge phase with a dividing ratio of 3, switches 218, 206, and 217 are closed, while the remaining switches are open. This set of switch positions couple capacitors 202 and 203 in series between input power supply node 213 and switch node 106. During a discharge phase with a dividing ratio of 3, switches 207, 208, 211 and 212 are closed, while the remaining switches are open. This set of switch positions couples each of capacitors 202 and 203 between switch node 106 and ground supply node 214.

When operating in a charge phase with a dividing ratio of 4, switches 204, 205, 206 and 214 are closed, while the remaining switches are in the open position. In this case, capacitors 201, 202, and 203 are coupled in series between input power supply node 213 and switch node 106. During a discharge phase with a dividing ratio of 4, each of capacitors 201, 202, and 203 is coupled between switch node 106 and ground supply node 214 by closing switches 207, 208, 209, 210, 211, and 212, and opening the remaining switches.

As described below, control circuit 102 may switch between different dividing ratios, allowing the voltage level on regulated power supply node 104 to vary between ⅓ and ¼ of the voltage level of input power supply node 213. It is noted that the number of capacitors depicted in FIG. 2 allows for dividing ratios of 3 and 4. In other embodiments, additional capacitors may be employed to allow for other dividing ratios. In such embodiments, additional switches may also be employed.

Figure 3:
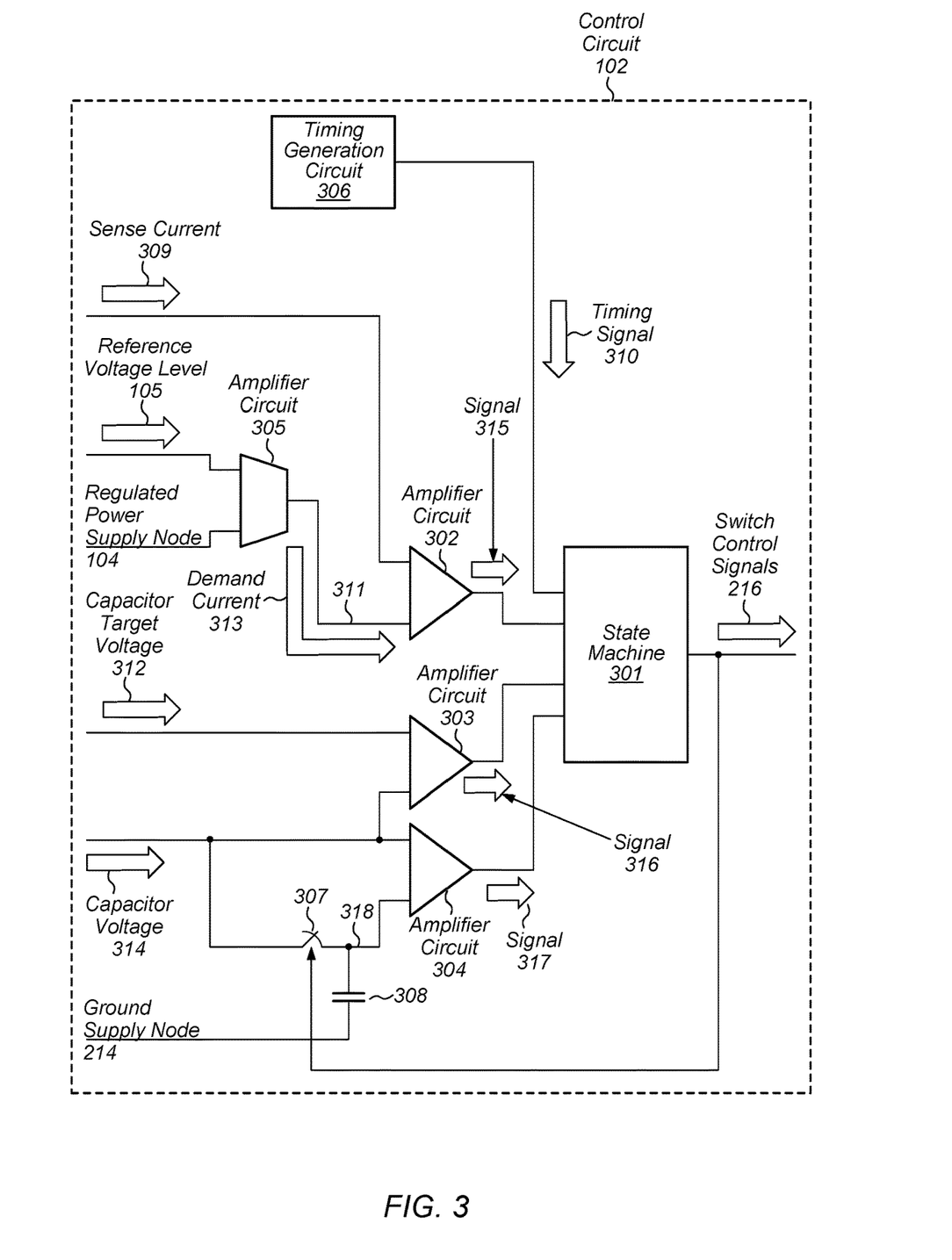
FIG. 3 is a block diagram of a control circuit used in a power converter circuit.

Turning to FIG. 3, a block diagram of an embodiment of control circuit 102 is depicted in FIG. 3. As illustrated, control circuit 102 includes state machine 301, amplifier circuits 302-305, switch 307, capacitor 308, and timing generation circuit 306.

Amplifier circuit 305 may, in various embodiments, be a particular embodiment of a operational transconductance amplifier, configured to generate demand current 313 using reference voltage level 105 and a voltage level of regulated power supply node 104. In some embodiments, a magnitude of demand current 313 may be proportional to a difference between reference voltage level 105 and the voltage level of regulated power supply node 104.

Amplifier circuit 302 is configured to generate signal 315 using demand current 313 and sense current 309. In various embodiments, amplifier circuit 302 may be a particular embodiment of a comparator circuits configured to change the logical value of signal 315 using results of a comparison of demand current 313 and sense current 309. For example, in some embodiments, if demand current 313 is greater than sense current 309, then amplifier circuit 302 may set signal 315 to a logical-1 value, otherwise amplifier circuit 302 may set signal 315 to a logical-0 value.

Amplifier circuit 303 may, in some embodiments, be a particular embodiment of a comparator circuit configured to generate signal 316 using capacitor target voltage 312 and capacitor voltage 314. In various embodiments, amplifier circuit 303 may be configured to change the logical value of signal 316, in response to a determination that capacitor voltage 314 is greater than capacitor target voltage 312.

Switch 307 is configured to selectively couple node 318 to capacitor voltage 314. When switch 307 is closed, capacitor 308, which is coupled between node 318 and ground supply node 214, is charged to a voltage level of capacitor voltage 314. By charging capacitor 308, in this fashion, the voltage level of capacitor voltage 314 may be sampled and stored for later use. In various embodiments, capacitor voltage 314 may correspond to a voltage level across capacitor 203 as depicted in FIG. 2. It is noted that switch 307 may, in some embodiments, be a particular example of a MOSFET or other suitable switching device. In various embodiments, capacitor 308 may be a particular embodiment of a MOM, or other suitable capacitor structure available on a semiconductor manufacturing process.

In various embodiments, amplifier circuit 304 may be a particular embodiment of a comparator circuit configured to generate signal 317 using capacitor voltage 314, and a voltage across capacitor 308. In various embodiments, amplifier circuit 304 may be configured to change the logical value of signal 317, in response to a determination that capacitor voltage 314 is greater than the voltage across capacitor 308.

Timing generation circuit 306 is configured to generate timing signal 310. As described below in more detail, timing generation circuit 306 may generate timing signal 310 using one of a variety of techniques and include different sub-circuits, such as delay circuits, phase-locked loop circuits, and the like.

State machine 301 may, in various embodiments, be an example of a sequential logic circuit configured to generate switch control signals 216. As described below in more detail, state machine 301 may transition between at least four states, each of which may set various ones of switch control signals 216 to different values in order to operate charge pump circuit 101. For example, state machine 301 may transition from a charge phase using a dividing ratio of 3 to a discharge phase using a dividing ratio of 3 using signal 315.

In various embodiments, state machine 301 may transition from the discharge phase using a dividing ratio of 3 to a discharge phase using a dividing ratio of 4 using signal 317. Alternatively, the change in dividing ratio may be triggered by timing signal 310. State machine 301 may, in some cases, transition from the discharge phase using a dividing ratio of 4 to a charge phase using a dividing ratio of 4 using signal 316. When the inductor current reaches a threshold level, state machine 301 may transition back to the charge phase with a dividing ratio of 3.

Timing signal 310, which ends a charging phase, may be generated in a variety of ways in order to allow power converter circuit 100 to operate with certain characteristics. For example, timing generator circuit 306 may be implemented to allow power converter circuit 100 to operate with a constant frequency. In other embodiments, timing generator circuit 306 may be implemented so that power converter circuit 100 operates with a constant current ripple.

Figure 4:
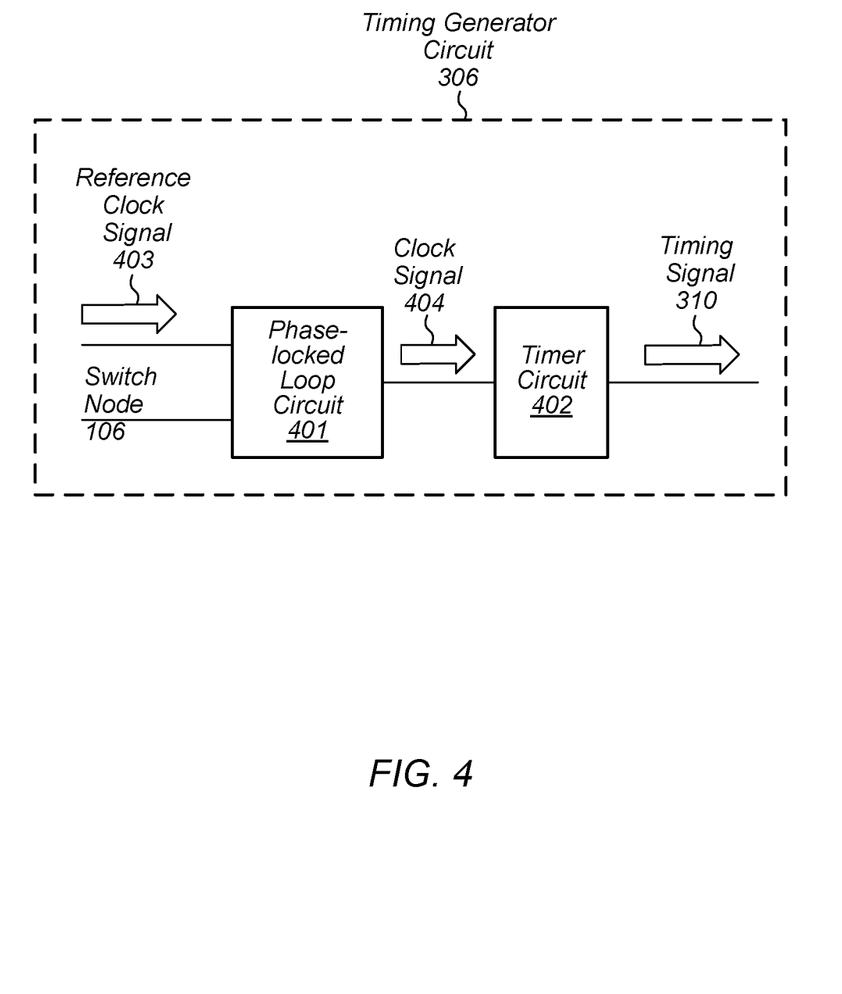
FIG. 4 is a block diagram of an embodiment of a timing generator circuit.

A block diagram of a particular embodiment of timing generator circuit 306 is depicted in FIG. 4. As illustrated, timing generator circuit 306 includes phase-locked loop circuit 401 and timer circuit 402.

Phase-locked loop circuit 401 is configured to generate clock signal 404 using reference clock signal 403 and a voltage level of switch node 106. In various embodiments, phase-locked loop circuit 401 may be configured to compare respective phases of clock signals 404 and reference clock signal 403 to generate a control signal. Phase-locked loop circuit 401 may include a voltage-controlled oscillator circuit that is configured to generate clock signal 404 using a voltage level of the control signal and a voltage level of switch node 106. In some embodiments, a frequency of clock signal 404 may be based, at least in part, on the respective voltage levels of the control signal and switch node 106.

Timer circuit 402 is configured to generate timing signal 310 using clock signal 404. In various embodiments, timer circuit 402 may be a particular embodiment of a sequential logic circuit configured to count a given number of pulses of clock signal 404 before changing a logic state of timing signal 310. In some cases, the number of pulses of clock signal 404 that timer circuit 402 uses to determine when to transition the logic data of timing signal 310 may be programmable.

Figure 5:
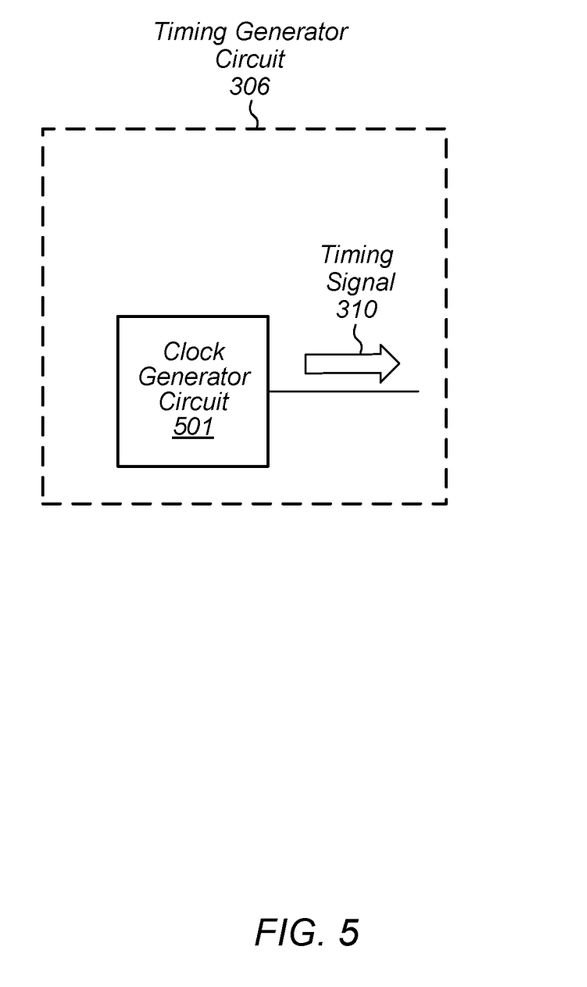
FIG. 5 is a block diagram of another embodiment of a timing generator circuit.

Another embodiment of timing generator circuit 306 is depicted in FIG. 5. As illustrated, timing generator circuit 306 includes clock generator circuit 501, which is configured to generate timing signal 310.

In various embodiments, clock generator circuit 501 may include any suitable oscillator circuit. For example, clock generator circuit 501 may include a crystal oscillator circuit, a voltage-controller oscillator, and the like, configured to generate a periodic signal with a particular frequency. The periodic signal may, in some embodiments, be further processes using flip-flop circuits, counter circuits, and the like to generate timing signal 310.

Figure 6:
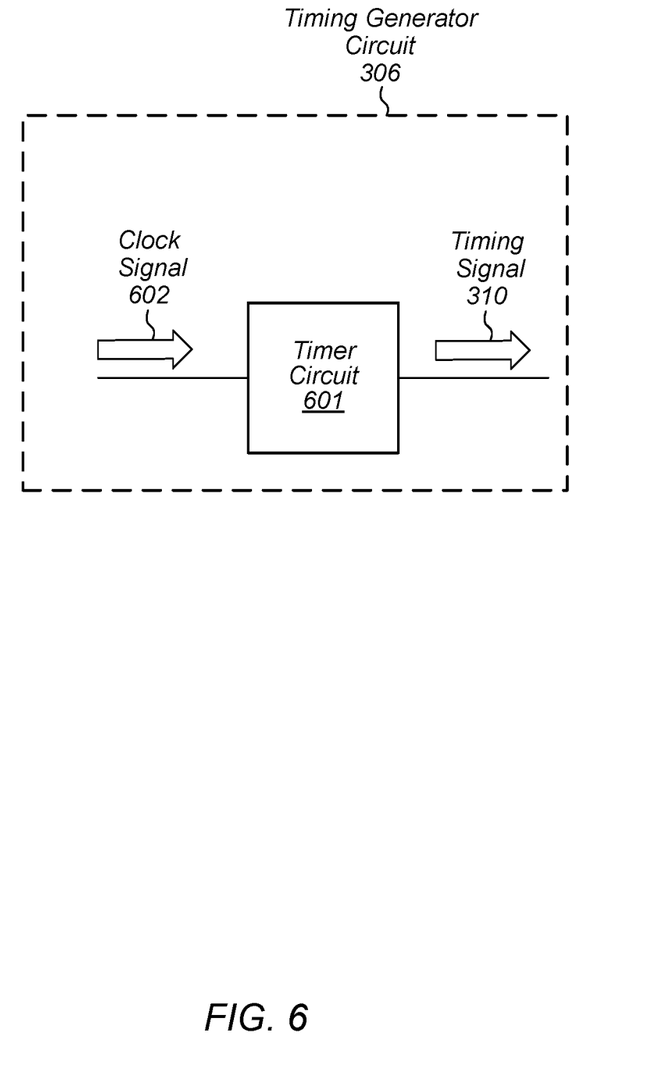
FIG. 6 is a block diagram of a different embodiment of a timing generator circuit.

In some cases, timing signal 310 may be generated using a clock signal generated externally to power converter circuit 100. An embodiment of timing generator circuit 306 that uses an externally generated clock signal is depicted in FIG. 6. As illustrated, timing generator circuit 306 includes timer circuit 601, which is configured to generate timing signal 310 using clock signal 602.

In various embodiments, timer circuit 601 may be a particular embodiment of a sequential logic circuit configured to track logical state changes in clock signal 602. After timer circuit 601 as detected a particular number of logical state changes in clock signal 602, timer circuit 601 changes the logical state of timing signal 310. For example, after 10 logical state changes of clock signal 602, timer circuit 601 may transition timing signal 310 from a logical-0 state to a logical-1 state. By comparing a count of the number of logical state changes of clock signal 602 to different threshold values, timer circuit 601 may generate timing signal 310 with varying frequencies. In some embodiments, the threshold value that timer circuit 601 compares to the count of the number of logical state changes of clock signal 602 may be programmable.

Figure 7:
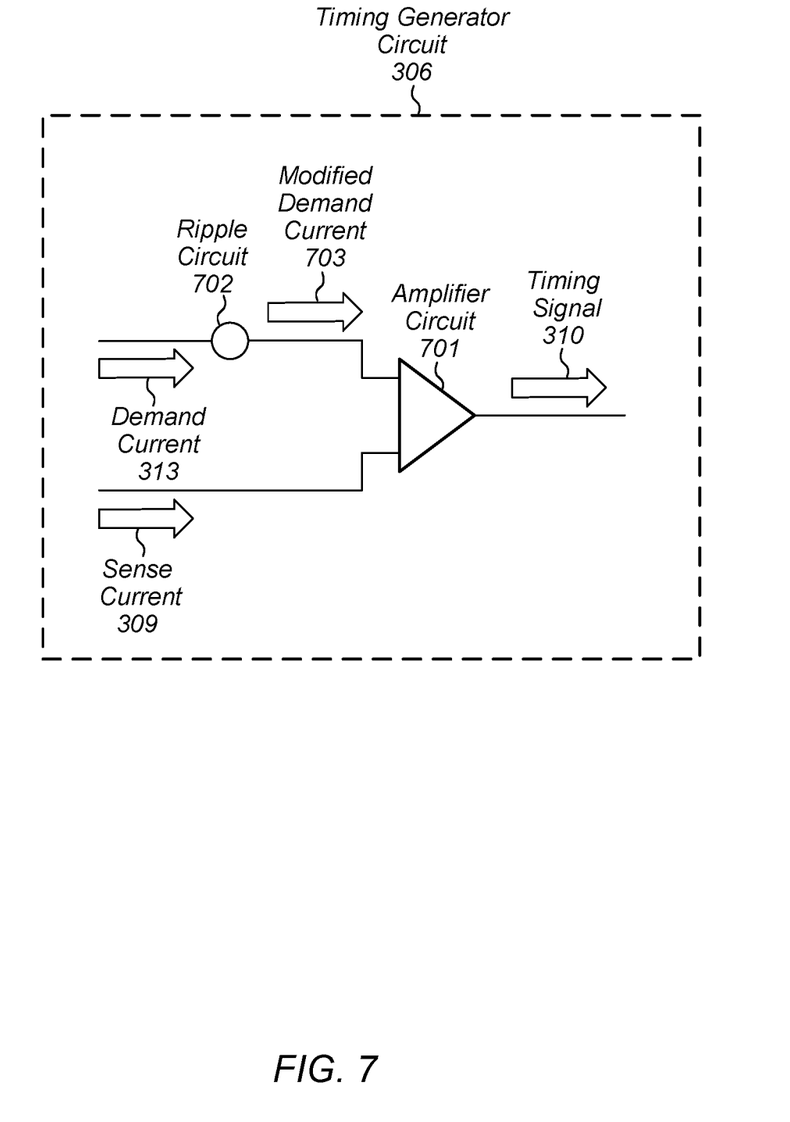
FIG. 7 is a block diagram of a particular embodiment of a timing generator circuit.

In some cases, a charge phase may be ended when a current flowing through the inductor exceeds a peak value plus an additional value (referred to herein as a "ripple value"). An embodiment of timing generator circuit 306 that generates timing signal 310 based on the current flowing through the inductor is depicted in FIG. 7. As illustrated, timing generator circuit 306 includes amplifier circuit 701 and ripple circuit 702.

Ripple circuit 702 may be a particular embodiment of a current summer circuit configured to add an additional current to demand current 313 to generate modified demand current 703. In some embodiments, the additional current may be generated using a reference voltage level generated by a circuit external to power converter circuit 100. In some cases, a value of the additional current may be programmable.

Amplifier circuit 701 may be a particular embodiment of a differential amplifier configured to generate an output voltage that is based, at least in part, on a difference between respective voltage levels at its input terminals as generated by modified demand current 703 and sense current 309. As illustrated, amplifier circuit 701 is configured to assert timing signal 310, in response to a determination that a value of sense current 309 exceeds a value of modified demand current 703.

As described above, a duration of a discharge phase may be determined when a voltage level of one of capacitors 103 reaches capacitor target voltage 311. In some cases, a value of capacitor target voltage 311 may be set to an arbitrary value without impacting the voltage level on regulated power supply node 104. It is noted, however, that capacitor target voltage 311 may be selected to ensure that a current flowing through inductor 111 remains constant during the discharge phase. A constant current flowing through inductor 111 may, in various embodiments, allow for the lowest operating frequency of power converter circuit 100 for a given ripple of the voltage level of regulated power supply node 104, thereby providing a high efficiency.

Figure 8:
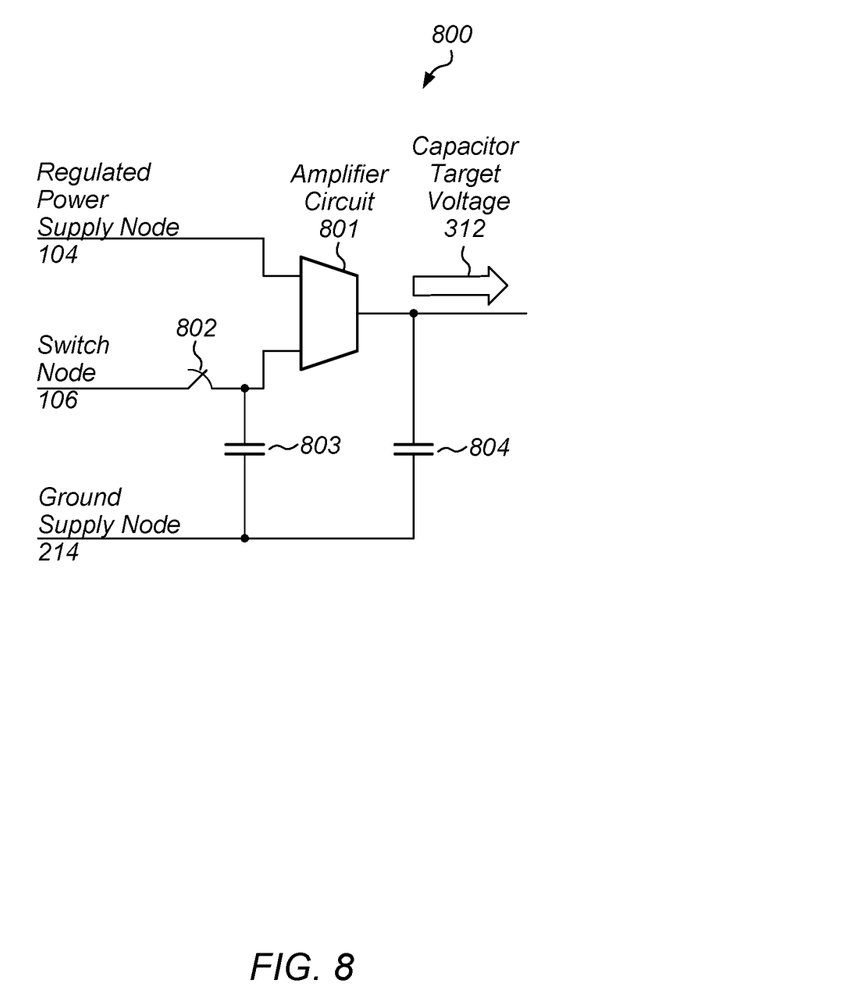
FIG. 8 illustrates a block diagram of a target voltage generator circuit.

A block diagram of an embodiment of a circuit for generating capacitor target voltage 311 is depicted in FIG. 8.

As illustrated, voltage generator circuit 800 includes amplifier circuit 801, switch 802, and capacitors 803 and 804.

Switch 802 is coupled between switch node 106 and capacitor 803, which is, in turn, coupled between an input to amplifier circuit 801 and ground supply node 214. In various embodiments, capacitor 803 may be implemented as a metal-oxide-metal (MOM) capacitor structure, or any other suitable capacitor structure available on a semiconductor manufacturing process. Switch 802 may, in various embodiments, include one or more metal-oxide semiconductor field-effect transistors configured to selectively coupled switch node 106 to capacitor 803 using a control signal (not shown).

During respective discharge phases for both dividing ratio associated with charge pump circuit 101, switch 802 is closed, sampling the voltage level of switch node 106 by storing charge on capacitor 803.

Capacitor 804 is coupled to an output of amplifier circuit 801. In various embodiments, amplifier circuit 801 may be a particular embodiment of a operational transconductance amplifier circuit configured to generate an output current proportional a difference between the respective voltage levels on its inputs. In the present embodiment, amplifier circuit 801 generates an output current whose value is based on a difference between regulated power supply node 104 and the sampled voltage of switch node 106 stored on capacitor 803. The output current charges capacitor 804 to generate capacitor target voltage 312.

By generating the output current as a function of the voltage level of regulated power supply node 104 and the sampled voltage level of switch node 106, amplifier circuit 801, in conjunction with capacitor 804, integrates an error between the two voltage levels. When power converter circuit 100 is operating in equilibrium, the value of capacitor target voltage 312 is such that there is no error between the voltage level of regulated power supply node 104 and the sampled voltage level of switch node 106 during the discharge phases.

Figure 9:
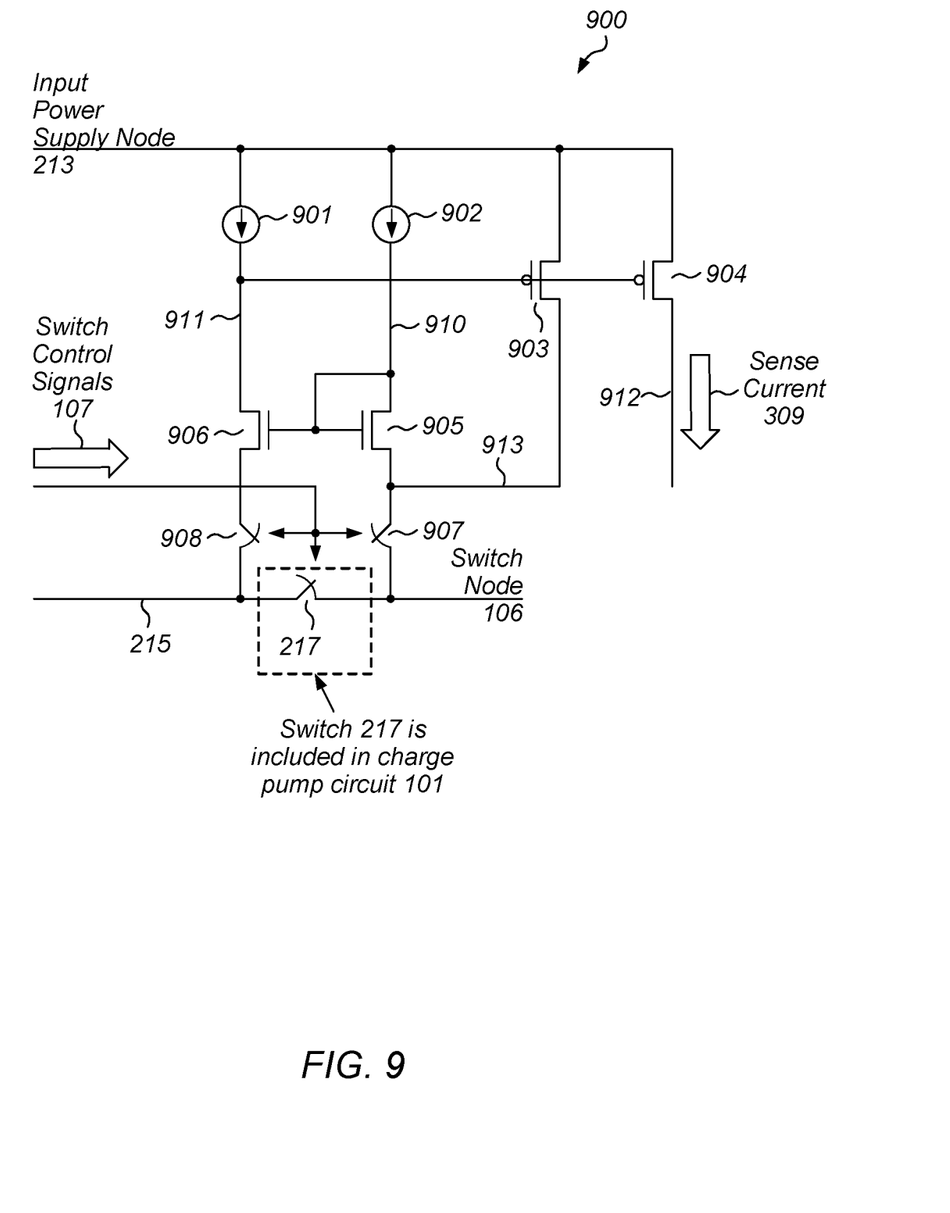
FIG. 9 illustrates a block diagram of a current sensor circuit.

As described above, current flowing through inductor 111 may be used to determine an end to a charging phase. An embodiment of a current sensor circuit is depicted in FIG. 9. As illustrated, current sensor circuit 900 includes current sources 901 and 902, devices 903-908, and switches 907 and 905. Current sensor circuit 900 is coupled to charge pump circuit 101

Current source 901 is coupled between input power supply node 213 and node 911, while current source 902 is coupled between input power supply node 213 and node 910. In various embodiments, currents sources 901 and 902 are configured to source bias currents into nodes 911 and 912, respectively. The values of the bias currents may, in some embodiments, be chosen based on a desired operating range of current sensor circuit 900, expected values of current flowing through inductor 111, and the like. It is noted that current sources 901 and 902 may include devices connect to current mirror or other bias circuits.

Device 903 is coupled between input power supply node 213 and node 913, and is controlled by a voltage level of node 911. In a similar fashion, device 904 is coupled between input power supply node 213 and node 912, and is configured to generate sense current 309 based, at least in part, on the voltage level of node 911.

Device 906 is coupled between node 911 and switch 908, and is controlled by a voltage level of node 910. Device 905 is coupled between 910 and 913, and is also controlled by the voltage level of node 910. In various embodiments, devices 905 and 906 are arranged in a current mirror circuit configuration, such that a current flowing through device 905 is replicated (also referred to as "mirrored") in device 906.

Switch 908 is coupled between device 906 and node 215, while switch 907 is coupled between node 913 and switch node 106. Referring back to FIG. 2, switch 217 is coupled between node 215 and switch node 106. Each of switches 907 and 908 is controlled by respective ones of switch control signals 216.

During a charge phase, switches 907 and 908 are closed, coupling device 906 to node 215, and coupling node 913 to switch node 106. As current flows from node 215 to switch node 106, or vice versa, a voltage drop across switch 217 resulting from the flow of current, presented to the source terminals of devices 905 and 906. The current mirror configuration of devices 905 and 906, result in a voltage level on node 911 that is proportional the current flowing through switch 217. The voltage level on node 911 is converted to sense current 309 by device 904.

Structures such as those shown in FIG. 2-9 for generating a particular voltage level on a regulated power supply node may be referred to using functional language. In some embodiments, these structures may be described as includes "a means for charging the switch node during a first charge period using a first set of capacitors of the plurality of capacitors," "a means for discharging the switch node during a first discharge period using the first set of capacitors," "a means for determining a duration of the first charge period using a reference voltage level and a voltage level of the regulated power supply node," and "a means for determining a duration of the first discharge period using a voltage level of at least one capacitor of the first set of capacitors."

The corresponding structure for "means for charging the switch node during a first charge period using a first set of capacitors of the plurality of capacitors" is capacitors 201-203, switches 204-212, and 217, and their equivalents. The corresponding structure for "means for discharging the switch node during a first discharge period using the first set of capacitors" is capacitors 201-203, switches 204-212, and 217, and their respective equivalents. Amplifier circuit 302, amplifier circuit 305, and state machine 301, and their respective equivalents, are the corresponding structure for "means for determining a duration of the first charge period using a reference voltage level and a voltage level of the regulated power supply node." The corresponding structure for "means for determining a duration of the first discharge period using a voltage level of at least one capacitor of the first set of capacitors" is amplifier circuit 304, switch 307, capacitor 308, state machine 301, and their respective equivalents.

Figure 10:
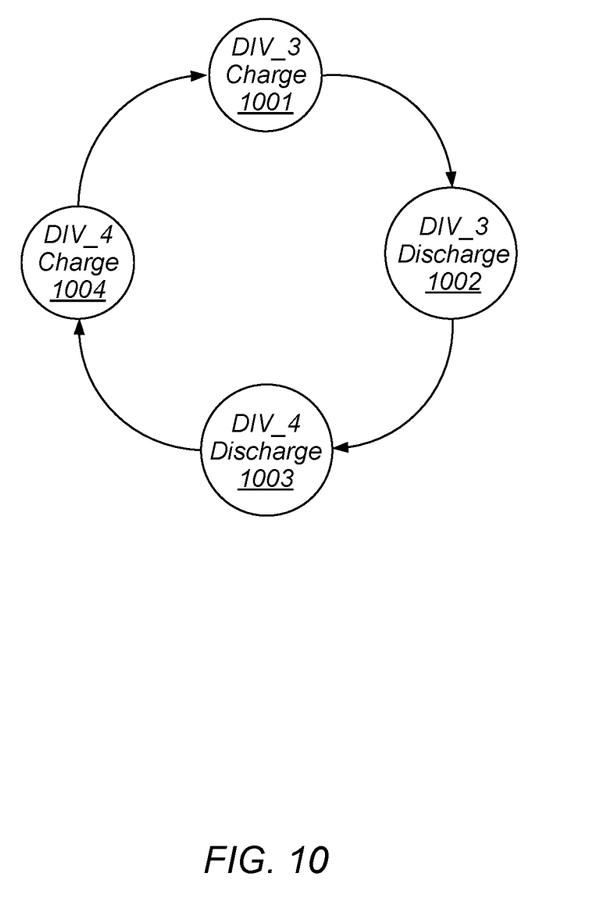
FIG. 10 depicts a state diagram associated with the operation of a power converter circuit.

As described above, power converter circuit 100 may operate using different dividing ratios within charge pump circuit 101 to achieve a desired voltage level on regulated power supply node 104. For example, using two dividing ratios of 3 and 4, power converter circuit 100 can regulate the voltage level on regulated power supply node 104 to a particular voltage level between the voltage level of input power supply node 213 divided by 3, and the voltage level of input power supply node 213 divided by 4. An example state diagram for using two dividing ratios (e.g., 3 and 4) is depicted in FIG. 10. Although four states with two dividing ratios is illustrated in the embodiment of FIG. 10, in other embodiments, additional states and additional or different dividing ratios may be employed.

In state 1001, power converter circuit 100 is operating in a charge phase using a dividing ratio of 3. During this state, inductor current increases until either a peak is reached or a particular duration expires, at which point the charge phase ends, and the power converter circuit 100 transitions for state 1002.

In state 1002, power converter circuit 100 is operating in a discharge phase using a dividing ratio of 3. In this state, respective voltage levels across capacitors 103 included charge pump circuit 101 begin to drop. When the voltage level across a particular one of the capacitors drops to a level substantially the same as that at the beginning of state 1001, power converter circuit 100 transitions to state 1003.

In state 1003, power converter circuit 100 is operating in a discharge phase using a dividing ratio of 4. During this discharge phase, the inductor current remains constant, i.e., the current flowing through the inductor remains within a threshold value of a particular current value, while the respective voltage levels of the capacitors continue to drop. When the voltage level across a particular one of the capacitors drops to capacitor target voltage 312, power converter circuit 100 transitions to state 1003.

In state 1004, power converter circuit 100 is operating in a charge phase using a dividing ratio of 4. During this charge phase, the voltage levels across the capacitors are increasing, while the current through the inductor is decreasing. The charge phase of state 1004 continues until the current flowing through the inductor falls to reaches a threshold level, at which point, power converter circuit 100 transitions back to state 1001, and the cycle through the different states repeats.

Figure 11:
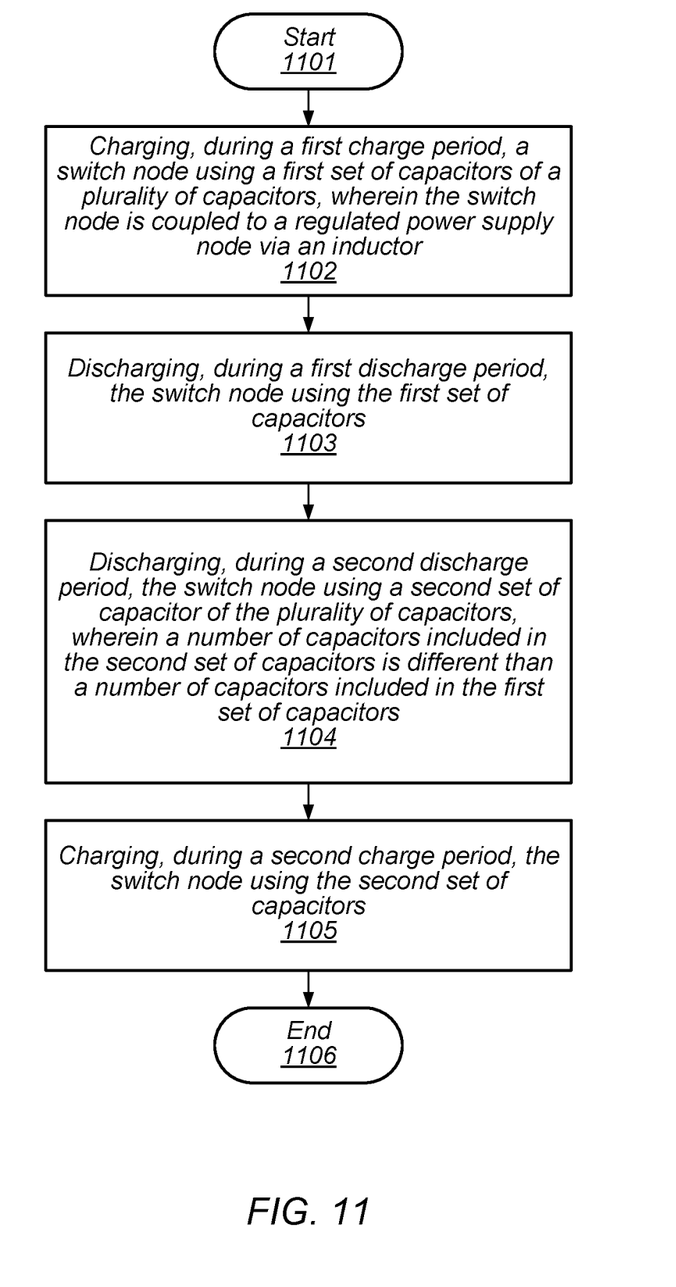
FIG. 11 illustrates a flow diagram depicting an embodiment of a method for operating a power converter circuit.

Turning to FIG. 11, a flow diagram of an embodiment of a method for operating a power converter circuit is depicted. The method, which may be applied to various power converter circuits including power converter circuit 100, begins in block 1101.

The method includes charging, during a first charge period, a switch node using a first set of a plurality of capacitors, wherein the switch node is coupled to a regulated power supply node via an inductor (block 1102). In various embodiments, the charging during the first charge period may include coupling the first set of capacitors of the plurality of capacitors in series between the switch node and an input power supply node.

In some cases, the method may further include determining a duration of the first charge period using a reference voltage level and a voltage level of the regulated power supply node. In various embodiments, the method may also include comparing the reference voltage level and the voltage level of the regulated power supply node to generate a threshold value. The method may further include halting the first charge period, in response to determining that a value of a current being flowing through the inductor during the first charge period exceeds the threshold value.

The method further includes discharging, during a first discharge period, the switch node using the first set of capacitors (block 1103). In some embodiments, the discharging during the first discharge period may include coupling each capacitor of the first set of capacitors between the switch node and a ground supply node. In some cases, the method may also include determining a duration of the first discharge period using a voltage level of at least one capacitor of the first set of capacitors.

The method also includes discharging, during a second discharge period, the switch node using a second set of capacitors of the plurality of capacitors, wherein a number of capacitors included in the second set of capacitors is different than a number of capacitors included in the first set of capacitors (block 1104).

The method further includes charging, during a second charge period, the switch node using the second set of capacitors (block 1105). The method concludes in block 1106.

Figure 12:
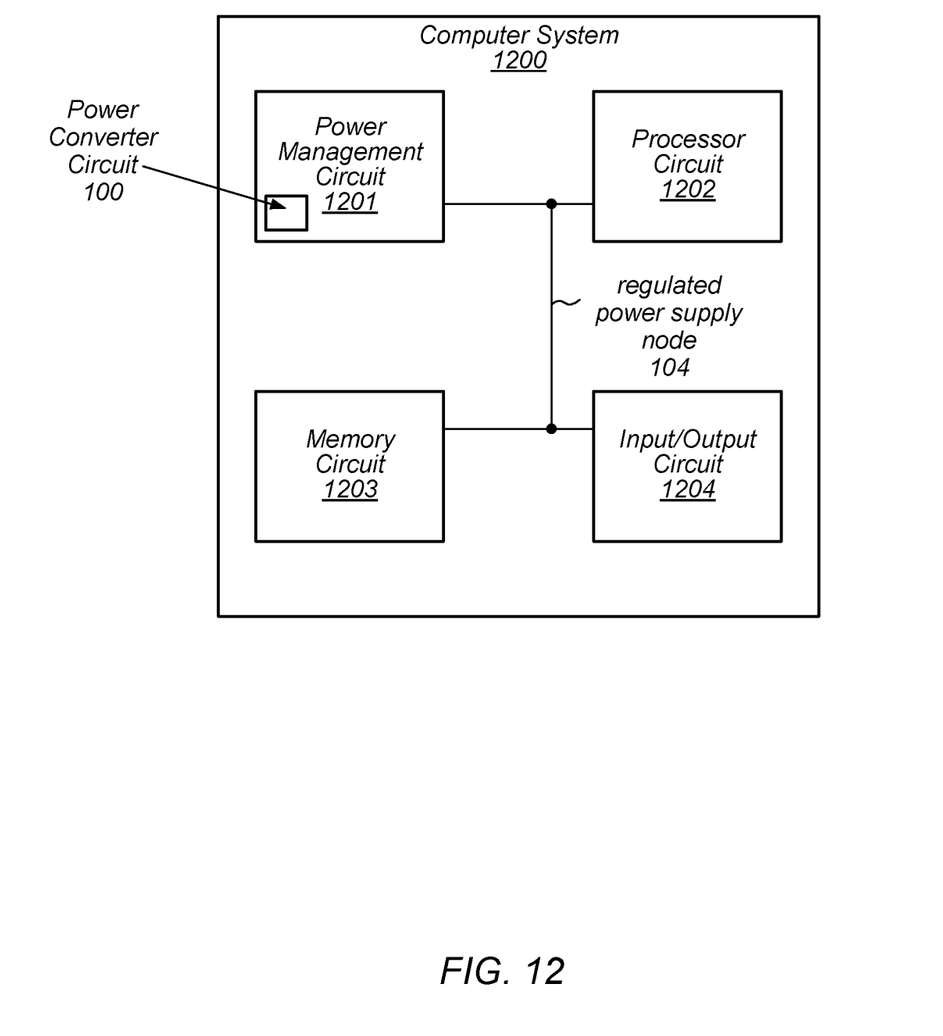
FIG. 12 is a block diagram of a computer system.

A block diagram of computer system is illustrated in FIG. 12. In the illustrated embodiment, the computer system 1200 includes power management unit 1201, processor circuit 1202, memory circuit 1203, and input/output circuits 1204, each of which is coupled to regulated power supply node 104. It is noted that processor circuit 1202, memory circuit 1203, and input/output circuits 1204 may be collectively referred to as "load circuits" for power management unit 1201. In various embodiments, computer system 1200 may be a system-on-a-chip (SoC) and/or be configured for use in a desktop computer, server, or in a mobile computing application such as, e.g., a tablet, laptop computer, or wearable computing device.

Power management unit 1201 includes power converter circuit 100 which is configured to generate a regulated voltage level on regulated power supply node 104 in order to provide power to processor circuit 1202, memory circuit 1203, and input/output circuits 1204. Although power management unit 1201 is depicted as including a single power converter circuit, in other embodiments, any suitable number of power converter circuits may be included in power management unit 1201, each configured to generate a regulated voltage level on a respective one of multiple internal power supply signals included in computer system 1200. In cases where multiple power converter circuits are employed, two or more of the multiple power converter circuits may be connected to a common set of power terminals that connections to power supply signals and ground supply signals of computer system 1200.

Processor circuit 1202 may, in various embodiments, be representative of a general-purpose processor that performs computational operations. For example, processor circuit 1202 may be a central processing unit (CPU) such as a microprocessor, a microcontroller, an application-specific integrated circuit (ASIC), or a field-programmable gate array (FPGA).

Memory circuit 1203 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 12, in other embodiments, any suitable number of memory circuits may be employed.

Input/output circuits 1204 may be configured to coordinate data transfer between computer system 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1204 may be configured to implement a version of Universal Serial Bus (USB) protocol or IEEE 1394 (Firewire®) protocol.

Input/output circuits 1204 may also be configured to coordinate data transfer between computer system 1200 and one or more devices (e.g., other computing systems or integrated circuits) coupled to computer system 1200 via a network. In one embodiment, input/output circuits 1204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a charge pump circuit including a plurality of capacitors, and a switch node coupled to a regulated power supply node via an inductor, wherein the charge pump circuit is configured to:
charge the switch node during a first charge period using a first set of capacitors of the plurality of capacitors; and
discharge the switch node during a first discharge period using the first set of capacitors; and
a control circuit configured to:
determine a duration of the first charge period using a reference voltage level and a voltage level of the regulated power supply node; and
determine a duration of the first discharge period using a voltage level of at least one capacitor of the first set of capacitors.

2. The apparatus of claim 1, wherein the charge pump circuit is further configured to:
charge the switch node during a second charge period using a second set of capacitors of the plurality of capacitors, wherein a number of capacitors included in the second set of capacitors is different from a number of capacitors included in the first set of capacitors; and
discharge the switch node during a second discharge period using the second set of capacitors.

3. The apparatus of claim 2, wherein to charge the switch node during the first charge period, the charge pump circuit is further configured to couple the first set of capacitors in series between the switch node and an input power supply node.

4. The apparatus of claim 3, wherein to discharge the switch node during the first discharge period, the charge pump circuit is further configured to couple each capacitor of the first set of capacitors between the switch node and a ground supply node.

5. The apparatus of claim 1, wherein to determine the duration of the first charge period, the control circuit is further configured to:
  generate a threshold value using results of a comparison between the reference voltage level and the voltage level of the regulated power supply node; and
  halt the first charge period in response to a determination that a value of a current being flowing through the inductor during the first charge period exceeds the threshold value.

6. The apparatus of claim 5, wherein to determine the duration of the first discharge period, the control circuit is further configured to:
  determine, at a beginning of the first charge period, an initial voltage level across a particular capacitor of the first set of capacitors; and
  halt the first discharge period in response to a determination that a current voltage level across the particular capacitor during the first discharge period less than the initial voltage level across the particular capacitor.

7. A method, comprising:
  charging, during a first charge period, a switch node using a first set of a plurality of capacitors, wherein the switch node is coupled to a regulated power supply node via an inductor;
  discharging, during a first discharge period, the switch node using the first set of the plurality of capacitors;
  discharging, during a second discharge period, the switch node using a second set of the plurality of capacitors, wherein a number of capacitors included in the second set of the plurality of capacitors is different than a number of capacitors included in the first set of the plurality of capacitors; and
  charging, during a second charge period, the switch node using the second set of the plurality of capacitors.

8. The method of claim 7, wherein charging during the first charge period, the switch node includes coupling the first set of the plurality of capacitors in series between the switch node and an input power supply node.

9. The method of claim 8, wherein discharging, during the first discharge period, the switch node includes coupling each capacitor of the first set of the plurality of capacitors between the switch node and a ground supply node.

10. The method of claim 7, further comprising, determining a duration of the first charge period using a reference voltage level and a voltage level of the regulated power supply node.

11. The method of claim 10, further comprising, determining a duration of the first discharge period using a voltage level of at least one capacitor of the first set of the plurality of capacitors.

12. The method of claim 10, wherein determining the duration of the first charge period includes comparing the reference voltage level and the voltage level of the regulated power supply node to generate a threshold value.

13. The method of claim 12, further comprising, halting the first charge period, in response to determining that a value of a current being flowing through the inductor during the first charge period exceeds the threshold value.

14. An apparatus, comprising:
  a load circuit coupled to a regulated power supply node; and
  a power converter circuit including a plurality of capacitors, and a switch node coupled to the regulated power supply node via an inductor, wherein the power converter circuit is configured to:
    charge, during a first charge period, the switch node using a first set of capacitors of the plurality of capacitors;
    discharge, during a first discharge period, the switch node using the first set of capacitors;
    discharge, during a second discharge period, the switch node using a second set of capacitors of the plurality of capacitors, wherein a number of capacitors included in the second set of capacitors is different than a number of capacitors included in the first set of capacitors; and
    charge, during a second charge period, the switch node using the second set of capacitors.

15. The apparatus of claim 14, wherein to charge, during the first charge period, the switch node, the power converter circuit is further configured to couple the first set of capacitors in series between the switch node and an input power supply node.

16. The apparatus of claim 15, wherein to discharge, during the first discharge period, the switch node, the power converter circuit is further configured to couple each capacitor of the first set of capacitors between the switch node and a ground supply node.

17. The apparatus of claim 14, wherein the power converter circuit is further configured to determine a duration of the first charge period using a reference voltage level and a voltage level of the regulated power supply node.

18. The apparatus of claim 17, wherein the power converter circuit is further configured to determine a duration of the first discharge period using a voltage level of at least one capacitor of the first set of capacitors.

19. The apparatus of claim 18, wherein to determine the duration of the first charge period, the power converter circuit is further configured to compare the reference voltage level and the voltage level of the regulated power supply node to generate a threshold value.

20. The apparatus of claim 19, wherein the power converter circuit is further configured to halt the first charge period, in response to a determination that a value of a current being flowing through the inductor during the first charge period exceeds the threshold value.

* * * * *